Sept. 3, 1968    R. C. HEBERT    3,399,692
HYDRAULIC FLOW VALVE SYSTEM
Filed May 6, 1966
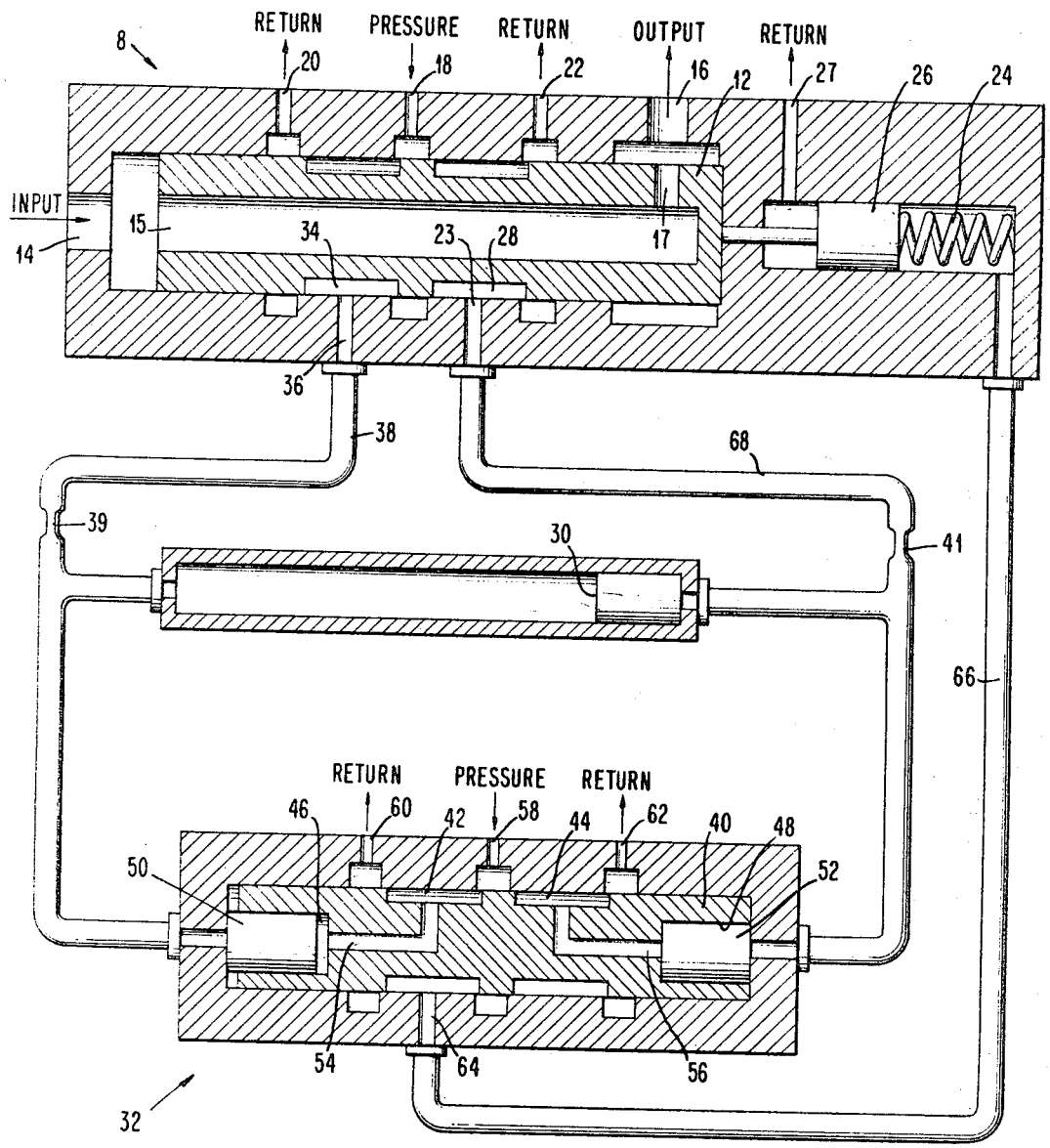
INVENTOR.
ROLAND C. HEBERT
BY John J. Goodwin
ATTORNEY United States Patent Office 3,399,692
Patented Sept. 3, 1968

3,399,692
HYDRAULIC FLOW VALVE SYSTEM
Roland C. Hebert, New Windsor, N.Y., assignor to International Business Machines Corporation, Armonk, N.Y., a corporation of New York
Filed May 6, 1966, Ser. No. 548,291
10 Claims. (Cl. 137—492.5)

ABSTRACT OF THE DISCLOSURE

A control device for a flow valve which permits the flow valve to move at the instant that the hydraulic flow exceeds a first and lower level. The control device then provides a return force, the application of this return force being delayed until the hydraulic flow reaches a second and higher level. The return force is chosen to have a value slightly less than the force produced across the flow valve by the hydraulic flow at the second level whereby the flow valve remains in position up to the instant that the flow falls below the second level, at which time the flow valve is reset by the return force. When the flow valve returns to its initial position, the return force ceases.

---

The present invention relates to hydraulic systems and more particularly to a control system for a hydraulic flow valve. A flow valve is a device which detects the presence or absence of flow of hydraulic fluid in a line. A flow valve is designed to include a spool which maintains a first position in the housing in the absence of flow of hydraulic fluid. When the hydraulic fluid begins to flow through the valve, the valve spool moves to a second position and stays there until the flow ceases, at which time the valve spool returns to its first position. It is desirable that a flow valve be provided which will move at the earliest possible time, that is, with a minimum of flow through the system and to return as rapidly as possible when the flow ceases.

It is an object therefore of the present invention to provide a sensitive rapid acting flow valve.

Another object of the present invention is to provide a flow valve including an associated control system which enables the flow valve to move to a new position when the flow through the system exceeds a first level and to return rapidly to the original position when the flow decreases below a second level.

The foregoing and other objects, features and advantages of the invention will be apparent from the following more particular description of a preferred embodiment of the invention, as illustrated in the accompanying drawing.

In the drawing:

The figure illustrates a schematic representation of a flow valve and an associated control system following the principles of the present invention. Referring to the figure, a flow valve 8 is shown including a valve body 10 and a spool 12. The flow valve is included in a hydraulic system with an input port 14 and an output port 16 to the system provided at either end of the valve body 10. The hydraulic fluid travels from input port 14, through port 15 in spool 12, through orifice 17 in spool 12, to output port 16. An annular pressure port 18 is provided in the valve body 10 to introduce hydraulic pressure from a pump source (not shown). Two annular return ports 20 and 22 are provided to return the hydraulic fluid to sump (not shown). When there is no flow of hydraulic fluid through the valve, that is, no flow from input port 14 through output port 16, the spool 12 is normally positioned to the left or input side of the valve body 10 by means of a bias spring 24 which is compressed aganst a return piston 26 which pushes on the valve spool 12. The bias force exerted by the spring 24 is minimal and is easily overcome as soon as hydraulic flow occurs through the valve. In its no-flow state, that is, when the valve spool 12 is to the left of the valve body 10, the hydraulic fluid introduced through pressure port 18 is directed out through port 23 via land 28, the effect of which will be described later. The output port 16 is hydraulically connected to some form of hydraulic output device such as a valve and piston. When flow occurs in the system, it builds up from a minimum value to a maximum value over a finite period of time. At the moment flow begins through input port 14 and out through output port 16, a differential pressure is produced across port 15 and orifice 17 of the flow valve spool 12 due to the difference in cross sectional area of the port 15 and the orifice 17 in spool 12 which is smaller than port 15. This differential pressure at the moment of minimum flow is sufficient to overcome the bias force of the bias spring 24 and the valve spool 12 will move to the right into the position as shown in the figure. The flow valve spool 12 will stay in its right position while maximum flow condition prevails in the system.

If no further structure were provided, the flow valve spool 12 would stay in the right-most position until the hydraulic flow decreased below the minimum flow point to permit the relatively small force of bias spring 24 to return the spool 12 to the left. However, in addition to moving the flow valve spool 12 to the right at the moment of minimum flow, it is also necessary that the valve spool 12 be returned to its initial position at the moment the flow ends, that is, at the moment it begins to fall below maximum, not after it has decreased to below the minimum flow point.

When the flow through the spool 12 begins to fall below the maximum value, there is still an almost maximum differential pressure forcing the spool 12 to the right. A force in addition to spring 24 must be applied, and this additional force must be applied only after maximum flow has been reached and the spool 12 has moved to the right. This additional force will be applied to the return piston 26. A hydraulic delay piston 30 and orifice 39 and a hydraulic latch valve 32 are provided in combination with the flow valves and the return piston 26 to provide the additional force and apply it at the proper time.

Referring to the figure, when the flow valve spool 12 moves to the right, hydraulic fluid under pressure from port 18 is permitted to flow through the spool land 34 through port 36 and be applied via hydraulic line 38 through orifice 39 to delay piston 30 and the left side of valve latch 32. The pressure occurring in line 38 may also be used as an indication that the flow valve 8 has been actuated. The function of the orifice 39 and the delay piston 30 is to provide a phase shift, that is, to allow the hydraulic flow through the flow valve 8 to build up to the maximum value before an additional return force is applied to the return piston 26. The orifice 39 provides a decreased pressure on its output side so that a decreased pressure is applied to the delay piston 30. The delay piston 30 initially offers minimum resistance to the hydraulic pressure introduced from port 36 through orifice 39 so that it will move to the right and the hydraulic latch 32 will be unaffected. After a delay piston 30 moves to the right a distance selected in accordance with the time required to build a maximum flow in the hydraulic system, delay piston 30 will come to the end of its chamber and stop. At this point, the pressure from port 36 will be all directed against the left side of latch valve 32.

The hydraulic latch valve is a known device. It includes a spool 40 which has lands 42 and 44. The spool has counter bores 46 and 48 at either end in which are fitted pistons 50 and 52, respectively. Counter bores 46 and 48 are hydraulically connected to the lands 42 and 44 by means of bored holes 54 and 56, respectively. The latch valve 32 further includes an annular input pressure port 58 and two annular output return ports 60 and 62 to return the hydraulic system to sump. An output port 64 is also provided. The latch valve 32 is normally in its left-most position so that pressure is not applied through output port 64. However, when the delay piston 30 has moved its complete distance to the right and pressure is directed entirely against the left side of the latch valve 32, the latch valve spool 40 will move to the right as shown in the figure and land 42 will permit hydraulic pressure to be applied from pressure port 58 to output port 64 and hole 54. Piston 50 will be forced to the left as shown in the figure and the pressure in the counter bore 46 will "latch" spool 40 in its right-most position. Hydraulic fluid under pressure will also be directed through hydraulic line 66 to the return piston 26. The area of return piston 26 is selected such that it in combination with the force of bias spring 24 provides a total force which is slightly less than the force due to the differential pressure across the flow valve 8 during the maximum flow. Thus, the valve spool 12 of the flow valve 8 still remains in its right-most position. As soon as flow through the flow valve 8 begins to cease and falls below maximum, the differential pressure between the port 15 and the orifice 17 will decrease and the pressure of the bias spring 24 plus the force on return piston 26 will be sufficient to move the valve spool 12 back to its initial left-most position. A return port 27 is provided for piston 26.

When valve spool 12 moves back to its initial left-most position, the land 34 is no longer exposed to pressure port 18 and therefore pressure is removed from output port 36. Thus, there is no longer a force applied at the left side of delay piston 30 or latch valve 32. Latch valve 32 still remains in its right-most position because the pressure introduced at port 58 thereof and channeled through hole 54 is still urging piston 50 to the left. However, when spool 12 of flow valve 8 fully returns to its left-most position, output port 23 is connected to the pressure port 18 via land 28. Pressure is applied via hydraulic line 68 to the right side of delay piston 30 through orifice 41 and to the right side of latch valve 32. The delay piston will then move to the left and assume its original position. When delay piston 30 has traveled entirely to the left and stops, pressure in line 68 will then be fully applied to the spool 40 of latch valve 32. The force against the right side of latch valve 32 is greater than the force applied to piston 50 via port 58. The spool 40 will move to the left and in doing so the connection between pressure port 58 and land 42 is closed and no further pressure is applied to piston 50 or through port 64 and line 66 to return piston 26. Instead, pressure port 58 is connected via land 44 to hole 56 thereby urging piston 52 to the right and effectively latching the spool 40 of latch valve 32 in its initial left-most position. Thus, it is seen that spool 12 of flow valve 8 is in its left-most position, the delay piston 30 is in its left-most position, the spool 40 of latch valve 32 is in its initial left-most position, and the pressure force against return piston 26 has been removed and the system is in its original state and may again operate as described to detect the next flow condition in the line.

What has been described is a hydraulic flow valve system wherein a flow valve is provided to detect the instant that flow occurs in a hydraulic line and yet will also immediately return to its initial position at the instant such flow begins to decrease below maximum. A feature of the system is the provision of a very minimal force for initially restraining the flow valve which may be overcome at the instant flow occurs and then the provision of an added force for returning the flow valve to its initial state when the flow begins to cease, the application of the additional force being delayed a sufficient time to allow maximum flow conditions in the hydraulic line to be established.

Although the description of the embodiment related to the condition where the flow valve spool 12 moved as soon as flow started in the system, it should be appreciated that by selecting the amount of force provided bias spring 24 and the force applied to return piston 26, the flow valve spool can be made to operate between any two levels of flow in the system. Thus, the flow valve system described actually indicates the instant when flow in the system exceeds a first selected level and the instant the flow decreases below a second selected level. While the invention has been particularly shown and described with reference to a preferred embodiment thereof, it will be understood by those skilled in the art that various changes in form and details may be made therein without departing from the spirit and scope of the invention.

What is claimed is:

1. A system for detecting changes in flow condition of a hydraulic fluids comprising:

first means disposed in the path of said hydraulic fluid for moving a predetermined distance in a first direction in response to an increase in said hydraulic flow above a given value, second means connected to said first means and responsive to the movement of said first means for producing a hydraulic pressure at a predetermined time when said hydraulic flow reaches a second given value, and means for applying said hydraulic pressure produced by said second means to said first means for moving said first means said predetermined distance in a direction opposite to said first direction when said hydraulic flow decreases below said second given value.

2. A system according to claim 1 wherein said first means is a hydraulic flow valve connected in a hydraulic line containing said hydraulic fluid, said flow valve including a spool having an input port and an output orifice at opposite ends of said spool, said input port being larger than said output orifice so that a differential pressure is produced between the ends of said spool in response to and proportional to said hydraulic flow through said spool, said flow valve further including a bias spring which applies a pressure to said spool which maintains said spool in a first position and wherein said spool moves to a second position when said differential pressure produced by said hydraulic flow exceeds the pressure applied by said bias spring.

3. A system according to claim 2 wherein said second means connected to said first means includes a hydraulic latch valve connected to said body of said flow valve by first and second hydraulic lines, said hydraulic latch valve including a spool being disposed in a first position when said flow valve spool is in its first position and said latch valve spool moving to a second position a predetermined time after said flow valve spool moves to its second position.

4. A system according to claim 3 further including a first hydraulic actuated piston abutting said flow value spool and a third hydraulic line connected between said piston and said latch valve for applying a predetermined force from said latch valve to said piston for moving said flow valve spool from its second position to its first position when the differential pressure between the ends of said flow valve is less than the predetermined pressure applied by said piston plus the pressure applied by said bias spring.

5. A system according to claim 4 wherein said second means further includes a second hydraulic piston connected between said first and second hydraulic lines.

6. A system for detecting changes in flow condition of a hydraulic fluid comprising:

a first hydraulic line containing hydraulic fluid subject to changes in flow, a flow valve connected in said hydraulic line in the path of said hydraulic fluid, said flow valve including a valve body, a valve spool in said valve body, said spool having a bore through which said hydraulic fluid may flow and an output orifice for producing a differential pressure across said spool proportional to hydraulic flow through said spool, a bias spring for applying a pressure to said spool for maintaining said spool in a first position, and wherein said spool moves to a second position when said force of said differential pressure produced by said hydraulic flow exceeds the force of pressure applied by said bias spring, said flow valve including a first pressure port connected to a source of hydraulic pressure and first and second output ports disposed so that said pressure from said first pressure port is applied to said first output port when said flow valve spool is in its first position and said pressure from said pressure port is applied to said second output port when said flow valve spool is in its second position, a second hydraulic line connected to said first output port of said flow valve body and a third hydraulic line connected to said second output port of said flow valve body, a first hydraulic piston connected between said second and third hydraulic lines, and a latch valve connected between said second and third hydraulic lines.

7. A system according to claim 6 wherein said second and third hydraulic lines each contain a constriction located between said respective first and second output ports and said connections to said first hydraulic piston and said latch valve for producing a pressure drop between said pressure at said first and second output ports and said hydraulic piston and latch valve, and wherein said first hydraulic piston is moved from a first to a second position in response to pressure in said second hydraulic line from said first output port and moved from said second to said first position in response to pressure in said third hydraulic line from said second output port.

8. A system according to claim 7 wherein said latch valve includes a spool, said latch valve spool moving from a first to a second position in response to pressure in said second hydraulic line subsequent to said first hydraulic piston moving to its said second position, and said latch valve spool moving from its said second position to its said first position in response to pressure in said third hydraulic line subsequent to said first hydraulic piston moving from its said second position to its said first position.

9. A system according to claim 8 wherein said latch value further includes a latch valve body having a pressure port connected to a source of hydraulic pressure and an output port connected to a fourth hydraulic line, said pressure from said pressure port of said latch valve body being connected through said output port of said latch valve body to said fourth hydraulic line when said latch valve spool moves from its said first position to its said second position and wherein said pressure in said fourth hydraulic line is removed when said latch valve spool moves from its said second position to its said first position.

10. A system according to claim 9 further including a second hydraulic piston abutting said flow valve spool and connected to said fourth hydraulic line for moving said flow valve spool from its said second position to its said first position in response to pressure in said fourth hydraulic line when said force produced in said second hydraulic piston by said pressure in said fourth hydraulic line and said force produced by said bias spring pressure is greater than the force produced on said flow valve by said differential pressure across said flow valve spool produced by said hydraulic flow.

References Cited

UNITED STATES PATENTS

| | | | |
|---|---|---|---|
| 2,655,169 | 10/1953 | Towler et al. | 137—494 XR |
| 2,781,049 | 2/1957 | Binford et al. | 137—494 XR |
| 3,073,335 | 1/1963 | Broders et al. | 137—494 XR |
| 3,114,380 | 12/1963 | Allen | 137—494 XR |
| 3,176,591 | 4/1965 | Howland | 137—494 XR |

M. CARY NELSON, *Primary Examiner.*

ROBERT J. MILLER, *Assistant Examiner*